(12) United States Patent
Higashi

(10) Patent No.: US 12,462,634 B2
(45) Date of Patent: Nov. 4, 2025

(54) WITHDRAWAL CONTROL APPARATUS, MONEY HANDLING SYSTEM, WITHDRAWAL CONTROL METHOD, AND NON-TRANSITORY COMPUTER-READABLE RECORDING MEDIUM

(71) Applicant: GLORY LTD., Himeji (JP)

(72) Inventor: Atsushi Higashi, Hyogo (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/416,950

(22) Filed: Jan. 19, 2024

(65) Prior Publication Data

US 2025/0239123 A1 Jul. 24, 2025

(51) Int. Cl.
  *G07D 11/23* (2019.01)
  *G07D 11/18* (2019.01)
  *G07D 11/235* (2019.01)

(52) U.S. Cl.
  CPC ............. *G07D 11/23* (2019.01); *G07D 11/18* (2019.01); *G07D 11/235* (2019.01)

(58) Field of Classification Search
  CPC ....... G07D 11/23; G07D 11/18; G07D 11/235
  See application file for complete search history.

(56) References Cited

U.S. PATENT DOCUMENTS

| 8,407,119 B2 * | 3/2013 | Folk | G07D 11/245 |
| | | | 235/375 |
| 11,386,738 B1 * | 7/2022 | Takashima | G07D 11/22 |
| 2017/0256113 A1 * | 9/2017 | Asada | G07D 11/24 |
| 2019/0172292 A1 * | 6/2019 | Fukuda | G07D 11/18 |
| 2021/0056794 A1 * | 2/2021 | Nakamoto | G07D 11/60 |

FOREIGN PATENT DOCUMENTS

| ES | 2927854 T3 * | 11/2022 | G07D 1/00 |
| JP | 2023-037307 | 3/2023 | |

* cited by examiner

*Primary Examiner* — Sonji N Johnson
(74) *Attorney, Agent, or Firm* — Amin, Turocy & Watson, LLP

(57) ABSTRACT

Provided is a withdrawal control apparatus that includes a processor that is configured to execute: performing determination whether an inventory amount of money stored in at least one of storage units storing money is in an accepted state, and deciding, in response to a withdrawal request for withdrawing money, which of a first path, which passes through a recognition unit that is configured to recognize the money, and a second path, which does not pass through the recognition unit, is used as a movement path of the money from the at least one of the storage units to a withdrawal unit, based on a result of the determination.

19 Claims, 9 Drawing Sheets

| CASE | STATE | STORAGE UNIT(S) WHOSE INVENTORY AMOUNT(S) IS/ARE IN NON-ACCEPTED STATE |
|---|---|---|
| FIRST CASE | DETECTION OF OPENING OF DOOR | ALL STORAGE UNITS |
| SECOND CASE | DETECTION OF DETACHMENT/ATTACHMENT OF STORAGE UNIT | DETACHED/ATTACHED STORAGE UNIT |
| THIRD CASE | DETECTION OF ERROR IN DIVERTER UNIT | STOEAGE UNITS ASSOCIATED WITH DIVERTER UNIT AT ERROR POINT AND ONE OR A PLURALITY OF DIVERTER UNITS ON DOWNSTREAM SIDE OF ERROR POINT |
| FOURTH CASE | DETECTION OF ERROR DURING TRANSPORT | STOEAGE UNIT(S) ASSOCIATED WITH ONE OR A PLURALITY OF DIVERTER UNITS ON DOWNSTREAM SIDE OF ERROR POINT |
| FIFTH CASE | DETECTION OF ERROR IN FEEDING OUT FROM STORAGE UNIT | STORAGE UNIT IN WHICH ERROR HAS OCCURED |
| SIXTH CASE | DETECTION OF POWER SUPPLY CUT OFF IN OPERATION | ALL STORAGE UNITS |

FIG. 2

WITHDRAWAL CONTROL APPARATUS, MONEY HANDLING SYSTEM, WITHDRAWAL CONTROL METHOD, AND NON-TRANSITORY COMPUTER-READABLE RECORDING MEDIUM

TECHNICAL FIELD

The present disclosure relates to a withdrawal control apparatus, a money handling system, a withdrawal control method, and a non-transitory computer-readable recording medium each of which performs control on withdrawal of money.

BACKGROUND ART

There is known a money handling apparatus that, in a case where money is withdrawn from a storage unit in which money is stored, withdraws money after a recognition unit recognizes the money. Further, there is known a money handling apparatus that, in a case where money is withdrawn from a storage unit in which money is stored, withdraws money without recognizing the money.

SUMMARY

A withdrawal control apparatus according to an aspect of the present disclosure comprises a processor that configured to execute: performing determination whether an inventory amount of money stored in at least one of storage units configured to store money is in an accepted state, and deciding, in response to a withdrawal request for withdrawing money, which of a first path, which passes through a recognition unit that configured to recognize the money, and a second path, which does not pass through the recognition unit, is used as a movement path of the money from the at least one of the storage units to a withdrawal unit, based on a result of the determination.

BRIEF DESCRIPTION OF DRAWINGS

FIG. 2 is a diagram provided for describing determination criteria in inventory amount determination processing;

DESCRIPTION OF EMBODIMENTS

Figure 1:
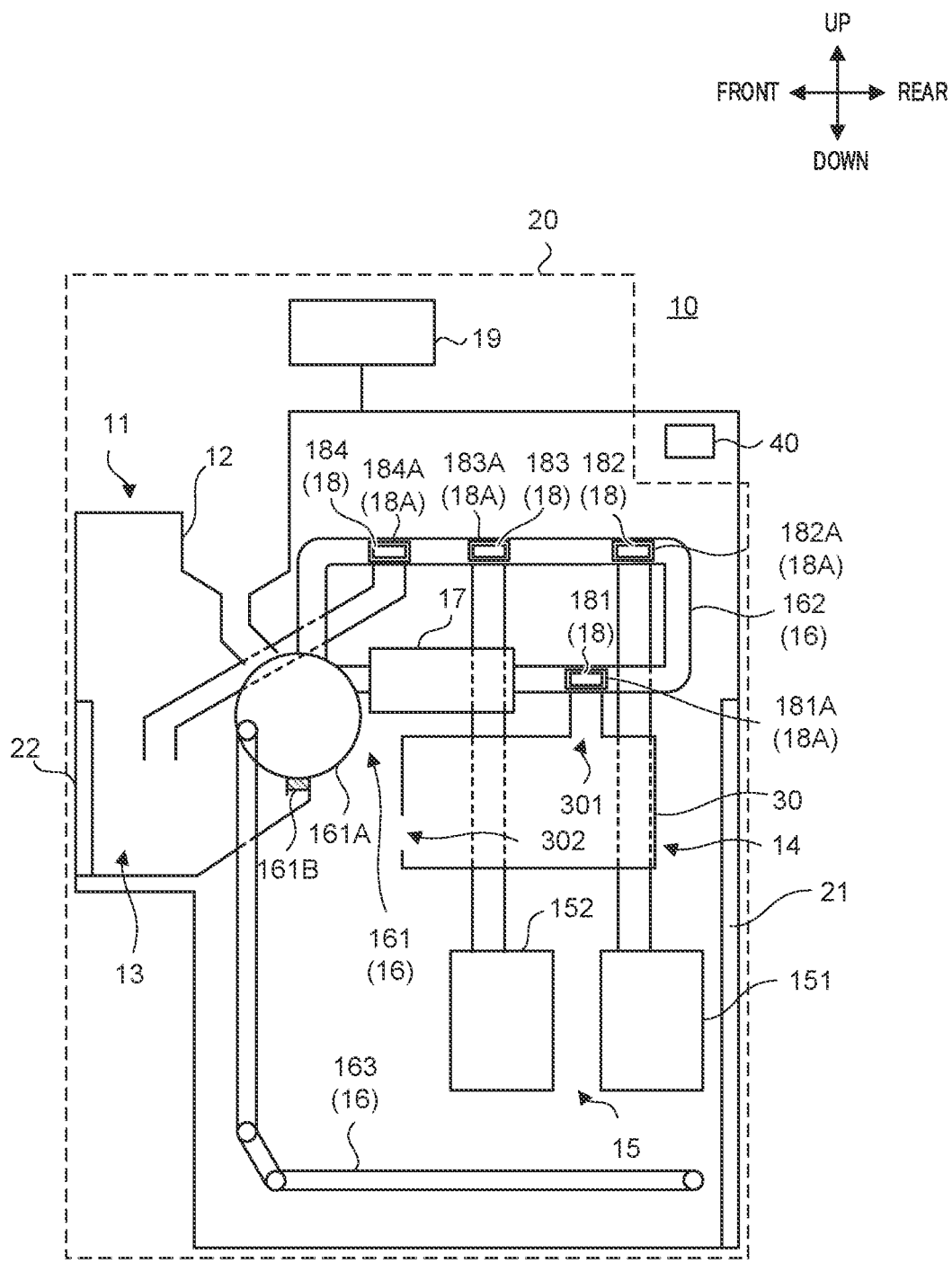
FIG. 1 is a diagram provided for describing a configuration of a withdrawal control apparatus according to Embodiment 1.

A withdrawal method in which money stored in a storage unit is withdrawn after recognizing the money makes it possible to perform a precise withdrawal in comparison with a withdrawal method in which money is withdrawn without recognizing the money. The withdrawal method in which money is withdrawn without recognizing the money, on the other hand, does not comprise a recognition unit in a transport route of money, and thus, can shorten the length of the transport route in comparison with the withdrawal method in which money is withdrawn after recognizing the money, and is therefore capable of performing a withdrawal in a short time and of reducing errors during transport. The errors during transport are, for example, a money jam, and the like.

As described above, the withdrawal method, in which money is withdrawn after recognizing the money, and the withdrawal method, in which money is withdrawn without recognizing the money, comprise advantages, respectively. For this reason, in a money handling apparatus, it is demanded to selectively use the withdrawal method, in which money is withdrawn after recognizing the money, and the withdrawal method, in which money is withdrawn without recognizing the money.

An object of the present disclosure is to provide a withdrawal control apparatus, a money handling system, a withdrawal control method, and a non-transitory computer-readable recording medium each capable of selectively using a withdrawal method, in which money is withdrawn after recognizing the money, and a withdrawal method, in which money is withdrawn without recognizing the money, depending on the state of a money handling apparatus.

A withdrawal control apparatus according to an aspect of the present disclosure comprises a processor that executes: performing determination whether an inventory amount of money stored in at least one of storage units storing money is in an accepted state, and deciding, in response to a withdrawal request for withdrawing money, which of a first path, which passes through a recognition unit that recognizes the money, and a second path, which does not pass through the recognition unit, is used as a movement path of the money from the at least one of the storage units to a withdrawal unit, based on a result of the determination.

Such a configuration makes it possible to selectively use the withdrawal method, in which money is withdrawn after recognizing the money, and the withdrawal method, in which money is withdrawn without recognizing the money, depending on the state of the money handling apparatus.

In the withdrawal control apparatus according to an aspect of the present disclosure, in the deciding, in a case where the inventory amount of the at least one of the storage units is in the accepted state, the processor may decide that the second path is used, and in a case where the inventory amount of the at least one of the storage units is in a non-accepted state, the processor may decide that the first path is used.

Such a configuration makes it possible to selectively use the withdrawal method, in which money is withdrawn after recognizing the money, and the withdrawal method, in which money is withdrawn without recognizing the money, depending on the state of the money handling apparatus.

In the withdrawal control apparatus according to an aspect of the present disclosure, in the deciding, in a case where the inventory amount of the at least one of the storage units is in a non-accepted state, the processor may decide that the first path is used, where the first path comprises a first portion through which the money is transported, the second path comprises a second portion through which the money is transported, and the first portion is longer than the second portion in length.

With such a configuration, the second path that enables a withdrawal in a shorter time can be used in a case where the inventory amount of the at least one of the storage units is accepted and it is unnecessary to recognize money to be withdrawn, and the first path that enables a more precise withdrawal can be used in a case where money to be withdrawn needs to be recognized.

In the withdrawal control apparatus according to an aspect of the present disclosure, in the performing of the determination, the processor may determine, in a case where it is detected that a door for accessing an inside of a money handling apparatus comprising the at least one of the storage units, the recognition unit, and the withdrawal unit has been opened, that the inventory amount of the at least one of the storage units is in a non-accepted state.

In the withdrawal control apparatus according to an aspect of the present disclosure, in the performing of the determination, the processor may determine, in a case where it is detected that the at least one of the storage units has been detached from a money handling apparatus comprising the at least one of the storage units, the recognition unit, and the withdrawal unit, or the at least one of the storage units has been attached to the money handling apparatus, that the inventory amount of the at least one of the storage units is in a non-accepted state.

In the withdrawal control apparatus according to an aspect of the present disclosure, in the performing of the determination, the processor may determine, in a case where it is detected that an error has occurred in a diverter unit that moves the money from a transport unit, which transports the money, to the at least one of the storage units, that the inventory amount of the at least one of the storage units is in a non-accepted state.

In the withdrawal control apparatus according to an aspect of the present disclosure, in the performing of the determination, the processor may determine, in a case where it is detected that an error has occurred while the money is being transported by a transport unit which transports the money, that the inventory amount of the at least one of the storage units is in a non-accepted state.

In the withdrawal control apparatus according to an aspect of the present disclosure, in the performing of the determination, the processor may determine, in a case where it is detected that an error has occurred when the money is fed out from the at least one of the storage units, that the inventory amount of the at least one of the storage units is in a non-accepted state.

In the withdrawal control apparatus according to an aspect of the present disclosure, in the performing of the determination, the processor may determine, in a case where it is detected that power supply has been cut off while a money handling apparatus comprising the at least one of the storage units, the recognition unit, and the withdrawal unit is in operation, that the inventory amount of the at least one of the storage units is in a non-accepted state.

In the withdrawal control apparatus according to an aspect of the present disclosure, in the performing of the determination, the processor may determine, in a case where it is detected that the at least one of the storage units for which only one denomination has been set in advance as a denomination of money to be stored has possibly stored money of a denomination other than the only one denomination having been set, that the inventory amount of the at least one of the storage units is in a non-accepted state.

Such configurations make it possible to accurately determine whether the inventory amount of the at least one of the storage units of the money handling apparatus is in an accepted state.

In the withdrawal control apparatus according to an aspect of the present disclosure, in the performing of the determination, the processor may perform the determination with respect to each of a first storage unit and a second storage unit among the storage units, and in the deciding, the processor may perform the deciding, in a case where a withdrawal is performed from the first storage unit, based on a result of the determination with respect to the first storage unit, regardless of a result of the determination with respect to the second storage unit.

With such a configuration, the second path that enables a withdrawal in a shorter time can be used in a case where the inventory amount of the at least one of the storage units is accepted and it is unnecessary to recognize money to be withdrawn, and the first path that enables a more precise withdrawal can be used only in a case where money to be withdrawn needs to be recognized.

In the withdrawal control apparatus according to an aspect of the present disclosure, in a case where the processor decides in the deciding that the first path is used, the processor may control, in response to the withdrawal request, a shutter, which is provided in the withdrawal unit, such that the shutter is closed while the money is moving from the at least one of the storage units to the withdrawal unit and, after all the money that is to be withdrawn is transported to the withdrawal unit, the shutter is opened.

Such a configuration makes it possible to prevent withdrawn money from being left behind and to cancel uncompleted withdrawal processing.

In the withdrawal control apparatus according to an aspect of the present disclosure, in a case where the processor decides in the deciding that the first path is used, the processor may perform control such that money to be withdrawn is transported from the at least one of the storage units to a temporary storage unit and, after all the money to be withdrawn is transported to the temporary storage unit, the money to be withdrawn is transported from the temporary storage unit to the withdrawal unit.

Such a configuration makes it possible to prevent withdrawn money from being left behind and to cancel uncompleted withdrawal processing.

In the withdrawal control apparatus according to an aspect of the present disclosure, the processor may perform control such that the money to be withdrawn is transported from the temporary storage unit to the withdrawal unit by using the second path.

Such a configuration enables a withdrawal in a shorter time.

Hereinafter, each embodiment of the present disclosure will be described with reference to the accompanying drawings.

Embodiment 1

FIG. 1 is a diagram provided for describing a configuration of a withdrawal control apparatus 10 according to Embodiment 1 of the present disclosure. The withdrawal control apparatus 10 is used, for example, as a settlement machine installed in a store of a retailer, a branch of a bank, or the like. The withdrawal control apparatus 10 is used by the user or the manager. The user is a person who deposits/withdraws a coin(s) by utilizing the withdrawal control apparatus 10 and is, for example, a customer in a store/branch at which the withdrawal control apparatus 10 is installed. The manager is a person who manages the withdrawal control apparatus 10 and is, for example, a clerk in a store/branch at which the withdrawal control apparatus 10 is installed.

The withdrawal control apparatus 10 comprises a casing 11, a deposit unit 12, a withdrawal unit 13, an attachment unit 14, a recycle storage unit 15, a transport unit 16, a recognition unit 17, a plurality of chutes 18, an operation display 19, and a control unit 40.

In Embodiment 1, an apparatus formed of the casing 11, the deposit unit 12, the withdrawal unit 13, the attachment unit 14, the recycle storage unit 15, the transport unit 16, the recognition unit 17, the plurality of chutes 18, and the operation display 19, which are the configurations comprised by the withdrawal control apparatus 10 except for the control unit 40, may also be referred to as a money handling apparatus 20. In other words, the withdrawal control apparatus 10 according to Embodiment 1 comprises the money handling apparatus 20 and the control unit 40.

[Configuration]

The withdrawal control apparatus 10 illustrated in FIG. 1 handles coins as an example of money. As coin handling, deposit processing, inventory amount determination processing, reconciliation processing, and withdrawal processing are exemplified. Note that, the withdrawal control apparatus of the present disclosure may be an apparatus that handles banknotes or may be an apparatus that handles both coins and banknotes.

[Money Handling Apparatus 20]

The casing 11 is a housing that comprises each configuration of the money handling apparatus 20 and the control unit 40 therein. The casing 11 is provided with a door 21 that can be opened and closed by the manager. The door 21 is unlocked and opened when the manager accesses the inside of the casing 11. The door 21 is normally locked and is configured, for example, such that the user cannot access the inside of the casing 11.

The deposit unit 12 is provided in a front portion of an upper surface part of the casing 11. The deposit unit 12 receives a deposit into the money handling apparatus 20 by the user.

The withdrawal unit 13 is provided in an upper portion of a front surface part of the casing 11. The withdrawal unit 13 is, for example, a tray for causing the user to receive a coin(s) withdrawn from the money handling apparatus 20. The withdrawal unit 13 may be provided with a shutter 22. The shutter 22 limits, in the closed state, access to a withdrawn coin(s), and allows, in the open state, the user to take out a coin(s).

The attachment unit 14 is a portion to which a cassette 30 is detachably attached. The attachment unit 14 is provided inside the casing 11. The manager can attach the cassette 30 to the attachment unit 14 or detach the cassette 30 from the attachment unit 14 by unlocking and opening the door 21 of the casing 11. Alternatively, the attachment unit 14 may comprise a structure that makes the attachment unit 14 accessible from outside of the casing 11. In this case, the manager can attach the cassette 30 to the attachment unit 14 or detach the cassette 30 from the attachment unit 14 without opening the door 21 of the casing 11.

The cassette 30 is an example of the storage units in the present disclosure. The cassette 30 comprises a reception port 301 for inserting a coin(s) into the cassette 30, and a discharge port 302 for discharging a coin(s) within the cassette 30. The reception port 301 is used to store a coin(s) inside the cassette 30. The discharge port 302 is used for discharging a coin(s) stored inside the cassette 30.

For example, when the recycle storage unit 15 reaches its full state, a coin(s) that has/have not been able to be put into the recycle storage unit 15 is/are stored in the cassette 30. In this case, the cassette 30 stores coins of a plurality of kinds of denominations.

When the cassette 30 is attached to the attachment unit 14, the cassette 30 can be controlled by the control unit 40.

Note that, not only the cassette 30, but the recycle storage unit 15 (a first denomination-specific storage unit 151 and a second denomination-specific storage unit 152) may also be attachable to or detachable from the attachment unit 14. The denomination-specific storage unit is the storage unit for which only one denomination has been set as a denomination of money to be stored. The manager can attach the recycle storage unit 15 to the attachment unit 14 or detach the recycle storage unit 15 from the attachment unit 14 by unlocking and opening the door 21 of the casing 11. Alternatively, the attachment unit 14 may comprise a structure that makes the attachment unit 14 accessible from outside of the casing 11 without opening the door 21 of the casing 11. In this case, the manager can attach the recycle storage unit 15 to the attachment unit 14 or detach the recycle storage unit 15 from the attachment unit 14 without opening the door 21 of the casing 11.

The recycle storage unit 15 is an example of the storage units in the present disclosure. In the example illustrated in FIG. 1, the recycle storage unit 15 comprises the first denomination-specific storage unit 151 and the second denomination-specific storage unit 152. The first denomination-specific storage unit 151 and the second denomination-specific storage unit 152 are configured so as to be capable of storing a coin(s) and feeding out a stored coin(s). Each of the first denomination-specific storage unit 151 and the second denomination-specific storage unit 152 store a coin (s) of one denomination set in advance.

In the following description, the cassette 30, the first denomination-specific storage unit 151, and the second denomination-specific storage unit 152 may be collectively referred to as the storage unit. In the present embodiment, a coin(s) as a withdrawal object(s) in withdrawal processing to be described later is/are stored in the first denomination-specific storage unit 151 or the second denomination-specific storage unit 152. Further, a coin(s) stored in the cassette 30 may be a withdrawal object(s).

The transport unit 16 comprises a feeding unit 161, a deposit transport unit 162, and a withdrawal transport unit 163.

The feeding unit 161 is capable of receiving a coin(s) deposited through the deposit unit 12, feeding out received coins one by one, and causing a received coin(s) to fall into the withdrawal unit 13. The feeding unit 161 comprises a hopper 161A that temporarily holds a plurality of coins.

Coins within the hopper 161A are fed out one by one toward the deposit transport unit 162 by a feeding mechanism inside the feeding unit 161. The feeding mechanism is, for example, a mechanism in which a rotary disk that rotates in an inclined state is used and coins are picked up one by one by a plurality of projection members in an outer area of a surface of the rotary disk and are fed out.

A bottom part of the hopper 161A is provided with an opening 161B. The opening 161B is normally closed. The withdrawal unit 13 is provided on a lower side of the opening 161B. When the opening 161B is opened by the control of the control unit 40, coins within the hopper 161A are discharged directly into the withdrawal unit 13 through the opening 161B.

The deposit transport unit 162 transports a coin(s) fed out from the feeding unit 161 to one of the cassette 30, the first denomination-specific storage unit 151, the second denomination-specific storage unit 152, and the withdrawal unit 13. The deposit transport unit 162 separates a plurality of coins from each other and transports the coins one by one.

The deposit transport unit 162 is formed in a loop shape such that a coin(s) to be transported can be returned to the feeding unit 161. The deposit transport unit 162 is formed of, for example, a combination of rollers, belts wound around the rollers, motors that drive the rollers, side walls, and the like.

The withdrawal transport unit 163 is provided downward from the attachment unit 14, the recycle storage unit 15, and the feeding unit 161. The withdrawal transport unit 163 transports a coin(s) fed out from at least one of the cassette 30, the first denomination-specific storage unit 151, and the second denomination-specific storage unit 152 to the feeding unit 161.

The recognition unit 17 is provided in the deposit transport unit 162. The recognition unit 17 recognizes the denomination, authentication, fitness, and the like of a coin(s) transported by the deposit transport unit 162 and counts coins for each denomination.

Each chute 18 comprises a cylinder structure that causes a coin(s) to fall from the deposit transport unit 162 into each storage unit or the withdrawal unit 13. The deposit transport unit 162 is provided with a plurality of diverter units 18A. The diverter unit 18A comprises a lid part provided in a part of the deposit transport unit 162, and a hole part connected to one of the chutes 18. When a coin(s) to be transported to the deposit transport unit 162 reach(es) one of the diverter units 18A, the lid part of the one of the diverter units 18A open, and thus, the coin(s) move(s) to the corresponding chute 18 through the hole part. Thus, a coin(s) pass(es) through each chute 18, fall(s) into the corresponding storage unit or the withdrawal unit 13, and move(s).

In the example illustrated in FIG. 1, the deposit transport unit 162 is provided with four diverter units 181A, 182A, 183A, and 184A in this order from the upstream side in the transport direction. The diverter unit 181A is associated with a chute 181 connected to the cassette 30. The diverter unit 182A is associated with a chute 182 connected to the first denomination-specific storage unit 151. The diverter unit 183A is associated with a chute 183 connected to the second denomination-specific storage unit 152. The diverter unit 184A is associated with a chute 184 connected to the withdrawal unit 13.

The operation display 19 is formed of, for example, a displaying apparatus comprising a touch screen. The operation display 19 functions as an operation unit for inputting information on various processing in the withdrawal control apparatus 10, and as a display that displays the information on various processing. Note that, the operation display 19 may be formed separately from the withdrawal control apparatus 10 or may be formed integrally with the withdrawal control apparatus 10. The operation display 19 may be configured such that an operation unit and a display are provided independently therein.

[Control Unit 40]

The control unit 40 executes various processing in the money handling apparatus 20. The various processing that is executed by the control unit 40 comprises, for example, deposit processing, replenishment processing, inventory amount determination processing, reconciliation processing, and withdrawal processing.

The control unit 40 is a processor, such as a central processing unit (CPU), formed of electric circuitry. The withdrawal control apparatus 10 comprising the control unit 40 is an example of a computer comprising a processor. The control unit 40 executes the various processing in the money handling apparatus 20 by executing instructions described in programs stored in a memory or the like comprised by the withdrawal control apparatus 10.

(Deposit Processing)

The control unit 40 executes deposit processing of receiving a deposit of a coin(s) paid by a customer, for example, at the time of the settlement of a commercial product. In the deposit processing, the control unit 40 controls the feeding unit 161 and the deposit transport unit 162 such that coins that have been received through the deposit unit 12 and have fallen into the hopper 161A are fed out one by one and are transported. The control unit 40 controls the recognition unit 17 such that the recognition unit 17 recognizes a coin(s) that is/are transported. Thus, the denomination, authentication, fitness, and the like of a coin(s) that is/are transported are recognized. The control unit 40 controls the deposit transport unit 162 and the diverter units 18A based on a recognition result in the recognition unit 17 such that a coin(s) that cannot be deposited is/are discharged as a rejected coin(s) from the withdrawal unit 13. The control unit 40 controls the deposit transport unit 162 and the diverter units 18A based on a recognition result in the recognition unit 17 such that coins that can be deposited are stored in the first denomination-specific storage unit 151 or the second denomination-specific storage unit 152 for each denomination. For example, in a case where the first denomination-specific storage unit 151 or the second denomination-specific storage unit 152 reaches its full state, the control unit 40 controls the deposit transport unit 162 and the diverter units 18A such that an overflow coin(s) is/are stored in the cassette 30.

(Replenishment Processing)

For example, in a case where coins stored in the recycle storage unit 15 decrease before or while a store/branch opens, the control unit 40 executes replenishment processing of replenishing the recycle storage unit 15 with a coin(s) stored in the cassette 30. In the replenishment processing, the control unit 40 controls the cassette 30 such that a coin(s) stored in the cassette 30 is/are discharged through the discharge port 302. The control unit 40 controls the withdrawal transport unit 163, the feeding unit 161, the deposit transport unit 162, and the recognition unit 17 such that a discharged coin(s) is/are recognized. The control unit 40 controls the deposit transport unit 162 and the diverter units 18A based on a recognition result in the recognition unit 17 such that coins are stored in the first denomination-specific storage unit 151 or the second denomination-specific storage unit 152 for each denomination.

(Inventory Amount Determination Processing)

The control unit 40 manages the inventory amount of each storage unit (the cassette 30, the first denomination-specific storage unit 151 or the second denomination-specific storage unit 152) of the money handling apparatus 20. The inventory amount is the number of money that is to be stored in one of the storage units. The inventory amount may be the number of money for each denomination that is to be stored in the one of storage units. The control unit 40 updates and stores the inventory amount(s) of one or a plurality of the storage units, whenever needed, based on the denomination(s) and number of money taken in the one or plurality of storage units and the denomination(s) and number of money taken out from the one or plurality of storage units.

For example, the denomination(s) and number of money taken in one or a plurality of the storage units or the denomination(s) and number of money taken out from one or a plurality of the storage units may become unclear due to the occurrence of an error inside the money handling apparatus 20. In such a case, the inventory amount(s) of the one or plurality of storage units, which is/are managed by the control unit 40, may not coincide with the denomination(s) or number of money actually stored in the one or plurality of storage units. In the present disclosure, such a state will be referred to as the "inventory amount(s)" of one or a plurality of the storage units "is/are in a non-accepted state". The control unit 40 executes, whenever needed, inventory amount determination processing of determining whether the inventory amount of at least one of the storage units of the money handling apparatus 20 is in a non-accepted state.

In a case where the control unit 40 determines that the inventory amount of a given storage unit is in a non-accepted state, the control unit 40 stores a flag, which indicates the state related to the inventory amount of the storage unit, as "non-accepted" in the memory. The control unit 40 sets the storage unit whose inventory amount is in a non-accepted state as an object of reconciliation processing to be described later. The reconciliation processing is processing of accepting the inventory amount(s) of one or a plurality of the storage units. In the memory, the control unit 40 rewrites the flag(s) of one or a plurality of the storage units, whose inventory amount(s) become(s) an accepted state by the reconciliation processing, with "accepted".

By performing inventory amount management in the above-described manner, the control unit 40 is capable of grasping a state in which one or a plurality of the storage units, for which the denomination(s) of money that is to be stored is/are set in advance, may store money of a denomination(s), which is not to be stored. The state meant by the inventory amount of at least one of the storage units in a non-accepted state comprises a state in which the at least one of the storage units possibly stores money of a denomination which is not to be stored.

In a case where one of first to sixth cases exemplified below is involved, the control unit 40 determines that the inventory amount(s) of one or a plurality of the storage units is/are in a non-accepted state. FIG. 2 is a diagram provided for describing determination criteria in the inventory amount determination processing. FIG. 2 illustrates descriptions of the respective cases in the determination criteria and one or a plurality of the storage units whose inventory amount(s) is/are in a non-accepted state.

(1) First Case

The first case is a case where it is detected that the door 21 of the casing 11 has been opened. As described above, the door 21 of the casing 11 is opened when the manager accesses the inside of the casing 11. In a case where the door 21 of the casing 11 has been opened, the manager can access the storage units, that is, the cassette 30, the first denomination-specific storage unit 151, and the second denomination-specific storage unit 152. For this reason, in the first case, the manager may have inserted a coin(s) into one of the storage units or may have taken out a coin(s) from one of the storage units. For this reason, after the door 21 of the casing 11 is opened, the inventory amounts of all the storage units, that is, the cassette 30, the first denomination-specific storage unit 151, and the second denomination-specific storage unit 152 are in a non-accepted state.

The control unit 40 may detect the presence or absence of the occurrence of the first case, for example, by an opening/closing sensor provided in the door 21 of the casing 11.

(2) Second Case

The second case is a case where it is detected that the cassette 30, the first denomination-specific storage unit 151 or the second denomination-specific storage unit 152 has been detached from the attachment unit 14 of the money handling apparatus 20 or that the cassette 30 has been attached to the attachment unit 14 of the money handling apparatus 20. In the second case, the manager may have inserted or taken out a coin(s) into or from a detached or attached storage unit, for example. For this reason, after one of the storage units is detached from the attachment unit 14 or is attached to the attachment unit 14, the inventory amount of the detached or attached storage unit is in a non-accepted state.

The control unit 40 may detect the presence or absence of the occurrence of the second case, for example, by an attachment/detachment sensor provided in the attachment unit 14.

(3) Third Case

The third case is a case where it is detected that an error has occurred in one of the diverter units 18A. An error in one of the diverter units 18A may occur, for example, in a case where a coin is caught in the lid part of the one of the diverter units 18A. In the third case, the control unit 40 may be incapable of grasping where a coin that had caused an error in one of the diverter units 18A has been transported thereafter. In the third case, the inventory amounts of the storage units associated with one of the diverter units 18A in which an error has occurred and another one/other ones of the diverter units 18A on the downstream side of the diverter unit 18A in which the error has occurred are in a non-accepted state, and thus, the inventory amounts of the storage units associated with those diverter units 18A are in a non-accepted state. Specifically, a coin that has caused an error in the diverter unit 182A provided in the chute 182 connected to the first denomination-specific storage unit 151 is transported to one of the first denomination-specific storage unit 151, the second denomination-specific storage unit 152, the withdrawal unit 13, and the feeding unit 161, which are associated with the diverter unit 182A described above and one or a plurality of the diverter units on the downstream side of the diverter unit 182A described above. In this case, the inventory amounts of the first denomination-specific storage unit 151 and the second denomination-specific storage unit 152 as the storage units are in a non-accepted state.

In a case where there is a plurality of storage units on the downstream side of one of the diverter units 18A in which an error has occurred, it may be configured such that only the inventory amount of, among the plurality of storage units, one of the storage units, which is closer to the one of the diverter units 18A in which the error has occurred, is in a non-accepted state.

The control unit 40 may detect the presence or absence of the occurrence of the third case, for example, by sensors provided in the lid parts of the diverter units 18A.

(4) Fourth Case

The fourth case is a case where it is detected that an error has occurred while a coin(s) is/are being transported by the transport unit 16. An error during transport by the transport unit 16 is detected, for example, in a case where a coin has jammed on the transport unit 16, in a case where two or more coins have been transported in an overlapped manner, or the like. In the fourth case, the inventory amount(s) of one or a plurality of the storage units, which is associated with one or a plurality of the diverter units 18A on the downstream side of a point at which an error has occurred, is/are in a non-accepted state.

The control unit 40 may detect the presence or absence of the occurrence of the fourth case, for example, by a sensor provided in the transport unit 16.

(5) Fifth Case

The fifth case is a case where it is detected that an error has occurred when a coin(s) is/are fed out from the cassette 30, the first denomination-specific storage unit 151, or the second denomination-specific storage unit 152. Each of the cassette 30, the first denomination-specific storage unit 151, and the second denomination-specific storage unit 152 comprises a mechanism for feeding out a coin(s) stored therein. The fifth case occurs in a case where a coin has jammed in the mechanism for feeding out a coin(s) or in a case where two or more coins are fed out in an overlapped manner, or the like. In the fifth case, the inventory amount of the storage unit in which an error has occurred is in a non-accepted state.

The control unit 40 may detect the presence or absence of the occurrence of the fifth case by sensors provided in the respective storage units.

(6) Sixth Case

The sixth case is a case where it is detected that power supply has been cut off while the money handling apparatus 20 (the withdrawal control apparatus 10) is in operation. What is meant by the money handling apparatus 20 in operation is a duration during which processing in which money may be transported (the deposit processing, the replenishment processing, the reconciliation processing, and the withdrawal processing except for the inventory amount determination processing) is being performed. When power supply is cut off while the processing in which money may be transported is being executed, the control unit 40 may be in a state incapable of grasping the whereabouts of a coin(s) that is/are being subjected to various processing. For this reason, in the sixth case, the inventory amounts of all the storage units are in a non-accepted state.

The control unit 40 may detect the presence or absence of the occurrence of the sixth case by an energization sensor provided in the money handling apparatus 20 (the withdrawal control apparatus 10).

Note that, even when power supply is cut off in a state in which the money handling apparatus 20 is not in operation, the inventory amounts of the respective storage units do not become a non-accepted state since no coin moves inside the money handling apparatus 20.

When the control unit 40 determines that one of the first to sixth cases described above is involved, the control unit 40 uses, for example, the operation display 19 to perform a notification that requests the execution of the reconciliation processing from the manager. In a case where the manager has performed an operation for the execution of the reconciliation processing in response to the notification, the control unit 40 executes the reconciliation processing. By the inventory amount determination processing, the storage unit whose inventory amount is determined as being in a non-accepted state becomes an object of the reconciliation processing.

The first to sixth cases described above are examples of the determination criteria in the inventory amount determination processing. In the present disclosure, even in a case other than the first to sixth cases, the control unit may determine in the inventory amount determination processing that the inventory amount of at least one of the storage units is in a non-accepted state.

Note that, in the inventory amount determination processing, even when there is/are a storage unit(s) whose inventory amount(s) is/are in a non-accepted state and the control unit 40 determines that the reconciliation processing is necessary, the control unit 40 may not execute the reconciliation processing until the manager performs an operation for the execution of the reconciliation processing, and may transition to an execution standby state of the reconciliation processing. In a case where a request for another processing (the deposit processing, the replenishment processing, or the withdrawal processing) is inputted in the execution standby state of the reconciliation processing, the control unit 40 controls the money handling apparatus 20, while the control unit 40 remains in the execution standby state, such that the money handling apparatus 20 executes the requested processing. Thus, for example, even when there is a state in which the inventory amount of one of the storage units of the money handling apparatus 20 is non-accepted and the reconciliation processing is necessary while a store/branch opens, it is possible to execute another processing without trouble.

(Reconciliation Processing)

As described above, the control unit 40 executes the reconciliation processing on a storage unit(s) set as an object(s) of the reconciliation processing as a result of determination by the inventory amount determination processing that the inventory amount(s) of the storage unit(s) is/are in a non-accepted state. The control unit 40 may also execute the reconciliation processing on a storage unit(s), which has/have become an object(s) of the reconciliation processing, in a case where the manager has performed an operation for the execution of the reconciliation processing.

In the reconciliation processing, the control unit 40 controls a storage unit(s) of the object(s) such that the storage unit(s) discharge(s) every coin stored therein. The control unit 40 controls the transport unit 16 and the diverter units 18A such that the discharged coin(s) pass(es) through the recognition unit 17 and return(s) to the original storage unit(s). At this time, a coin(s) of a denomination(s), which is/are not to be stored in the original storage unit(s), is/are transported to the cassette 30 or the withdrawal unit 13. Thus, every coin stored in the storage unit(s) of the object(s) is recognized by the recognition unit 17, and the number of coins is re-counted, and thus, the inventory amounts of the respective storage units become an accepted state. When the inventory amounts of the respective storage units are in an accepted, only money of a denomination(s) set in advance is stored in each storage unit. Note that, in a case where two or more storage units among the cassette 30, the first denomination-specific storage unit 151, and the second denomination-specific storage unit 152 become objects of the reconciliation processing at the same time, the reconciliation processing may be sequentially executed for each storage unit, for example.

(Withdrawal Processing)

The control unit 40 controls withdrawal processing of a coin(s) in response to an input of a withdrawal request, for example, at the time of the settlement of change for the user, or the like.

In the withdrawal processing, the control unit 40 controls, in response to a withdrawal request, the first denomination-specific storage unit 151 or the second denomination-specific storage unit 152 such that the first denomination-specific storage unit 151 or the second denomination-specific storage unit 152 feeds out the required number of coins of a required denomination. The control unit 40 controls the withdrawal transport unit 163 such that the withdrawal transport unit 163 transports coins, which have been fed out from the first denomination-specific storage unit 151 or the second denomination-specific storage unit 152 and have fallen into the withdrawal transport unit 163, one by one to the hopper 161A of the feeding unit 161. In a case where the required number of coins is not stored in the first denomination storage unit 151 or the second denomination storage unit 152, a coin(s) may be fed out from the cassette 30.

Figure 3:
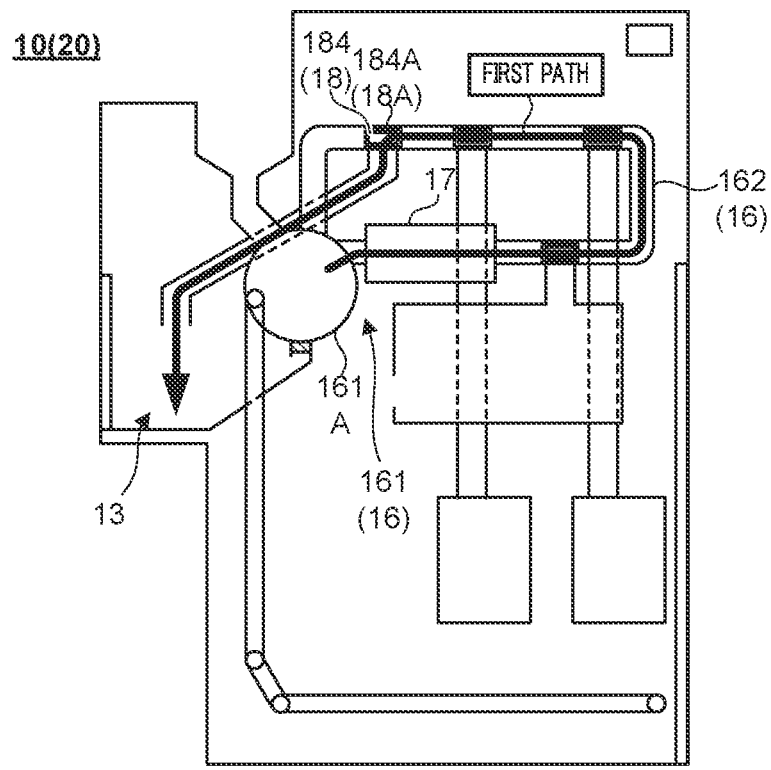
FIG. 3 illustrates a first path in a money handling apparatus.
Figure 4:
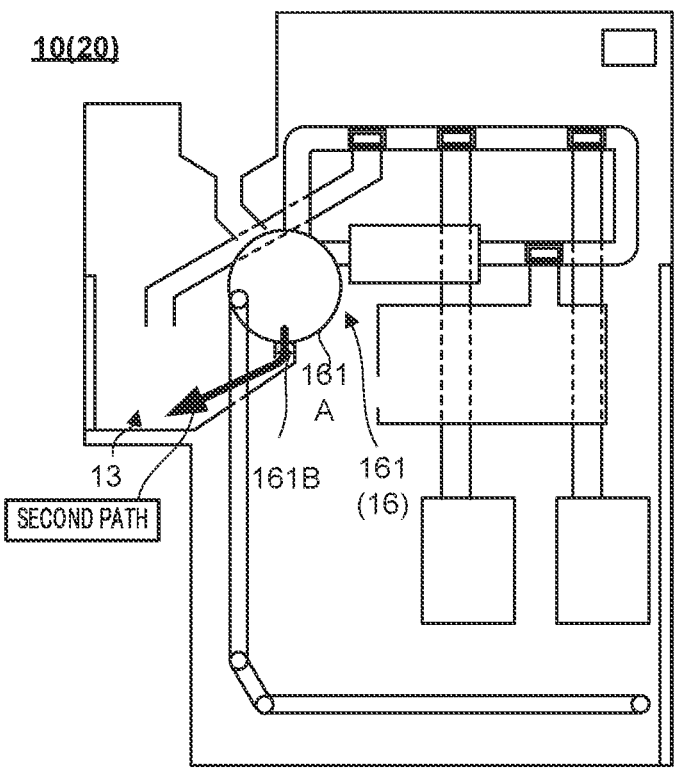
FIG. 4 illustrates a second path in the money handling apparatus.

In the withdrawal processing, a coin(s) temporarily stored in the hopper 161A pass(es) through a movement path, which is either a first path or a second path, and is/are moved to the withdrawal unit 13. FIG. 3 illustrates the first path. FIG. 4 illustrates the second path.

As illustrated in FIG. 3, the first path is a movement path in which a coin(s) is/are transported by the deposit transport unit 162 from the feeding unit 161 to the withdrawal unit 13 through the chute 184 while passing through the recognition unit 17. As illustrated in FIG. 4, the second path is a movement path in which a coin(s) stored in the feeding unit 161 fall(s) into the withdrawal unit 13 while passing through the opening 161B in the bottom part of the hopper 161A of the feeding unit 161.

When the first path and the second path are compared, the first path passes through the recognition unit 17, whereas the second path does not pass through the recognition unit 17. For this reason, in the withdrawal processing using the first path, a coin(s) is/are withdrawn after the denomination, authentication, fitness, and the like of the coin(s) are recognized, whereas in the withdrawal processing using the second path, no coin recognition is performed. For this reason, the withdrawal processing using the first path is more precise than the withdrawal processing using the second path.

Further, when the first path and the second path are compared, the first path is a path that passes through most of the deposit transport unit 162, whereas the second path is a path in which a coin(s) is/are caused to fall directly into the withdrawal unit 13 provided downward from the hopper 161A. Accordingly, the movement distance of a coin(s) in the second path is shorter than that in the first path. In other words, the first path is longer than the second path. The first path has a first portion as a movement path of a coin(s) from the feeding unit 161 via the recognition unit 17 to the withdrawal unit 13. The second path has a second portion as the movement path of a coin(s) from the feeding unit 161 unit to the withdrawal unit 13 without passing through the recognition unit 17. The first portion is longer than the second portion in length. Further, in the withdrawal processing using the first path, an error may occur during transport on the deposit transport unit 162, whereas the withdrawal processing using the second path does not pass through the deposit transport unit 162 and therefore does not involve such a risk. For these reasons, it can be expected that the withdrawal processing using the second path enables a withdrawal in a shorter time than the withdrawal processing using the first path and involves fewer errors.

As described above, the withdrawal processing using the first path and the withdrawal processing using the second path comprise advantages, respectively. The control unit 40 selects, based on whether the inventory amount of one of the storage units is non-accepted, which of the first path and the second path is used to perform a withdrawal. Specifically, the control unit 40 selects, based on a result of the inventory amount determination processing at a point in time when a withdrawal request is acquired, which of the first path and the second path is used.

Specifically, in a case where one of the first to sixth cases described above has been detected, the control unit 40 determines that the inventory amount of one of the storage units is non-accepted, and decides that the first path is used. In a case where none of the first to sixth cases described above has been detected, on the other hand, the control unit 40 determines that the inventory amounts of all the storage units are accepted, and decides that the second path is used. Thus, it is possible to perform more appropriate withdrawal processing according to the state of the money handling apparatus 20.

Figure 5:
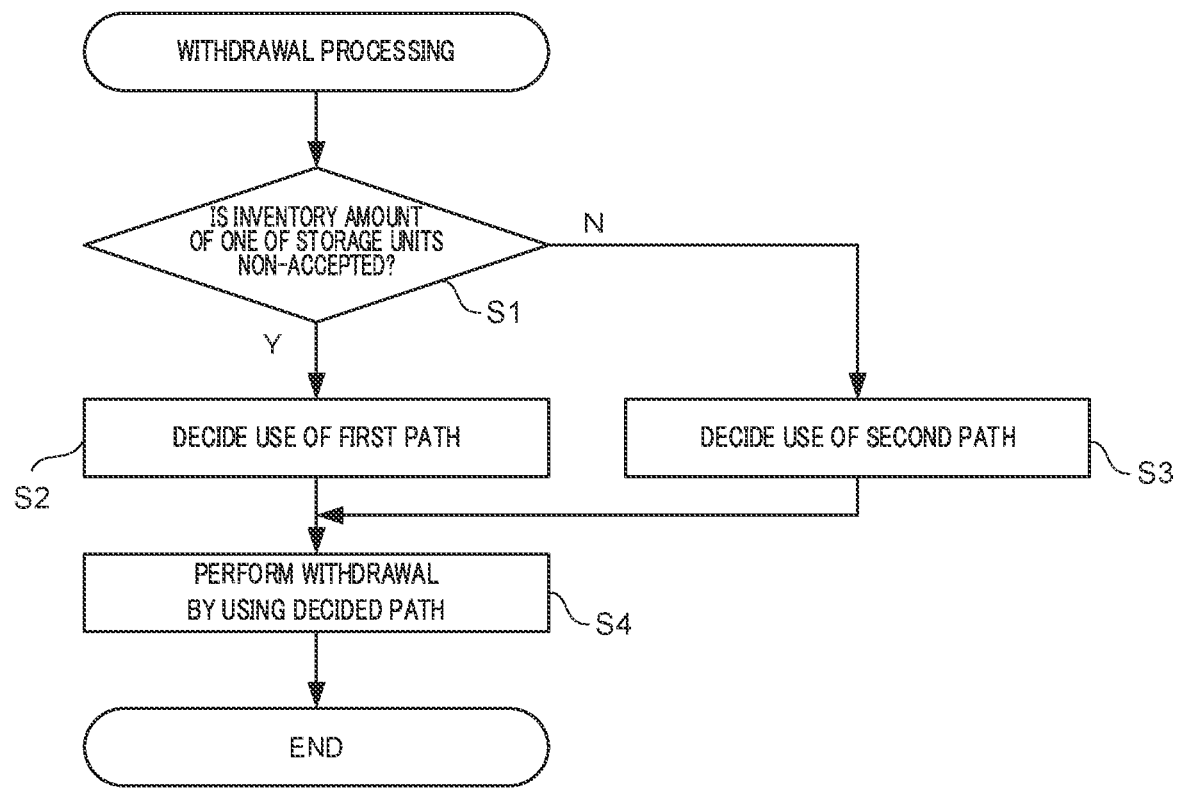
FIG. 5 is a flowchart provided for describing an operation example of withdrawal processing in the withdrawal control apparatus.

FIG. 5 is a flowchart provided for describing an operation example of the withdrawal processing in the withdrawal control apparatus 10.

In step S1, the control unit 40 refers to the flags of the states related to the inventory amounts of the storage units, and determines whether the inventory amount of one of the storage units is in a non-accepted state. As described above, the control unit 40 determines the states related to the inventory amounts of the respective storage units by the inventory amount determination processing whenever needed. The storage unit whose inventory amount is in a non-accepted state is a storage unit on which the reconciliation processing is not performed after the inventory amount thereof is determined as being in a non-accepted state by the inventory determination processing. As described above, the flag "non-accepted" is stored in the memory in a case where the inventory amount of one of the storage units is in a non-accepted state, whereas the flag "accepted" is stored in the memory in a case where the inventory amount of one of the storage units is in an accepted state.

The control unit 40 advances the processing to step S2 in a case where the control unit 40 determines in step S1 that the inventory amount of one of the storage units is in a non-accepted state (step S1: Y), whereas the control unit 40 advances the processing to step S3 otherwise (step S1: N).

In step S2, the control unit 40 decides that a withdrawal is performed by using the first path.

In step S3, the control unit 40 decides that a withdrawal is performed by using the second path.

In step S4, the control unit 40 controls at least one of: the storage unit; the withdrawal transport unit 163; the feeding unit 161; the deposit transport unit 162; the recognition unit 17; and the diverter unit(s) 18A such that a coin(s) is/are withdrawn through the path decided in step S2 or S3.

Specifically, in a case where the first path is used, the control unit 40 causes coins within the feeding unit 161 to be transported one by one to the withdrawal unit 13 by controlling the feeding mechanism of the storage unit, the withdrawal transport unit 163, the feeding mechanism of the feeding unit 161, the deposit transport unit 162, the recognition unit 17, and the diverter unit 184A. Further, the control unit 40 causes a coin(s), which is/are recognized by the recognition unit 17 as not being to be withdrawn, to be transported to one of the storage units by controlling the diverter unit 181A, the diverter unit 182A, or the diverter unit 183A.

In a case where the second path is used, the control unit 40 causes every coin within the feeding unit 161 to fall into be the withdrawal unit 13 by controlling the feeding mechanism of the storage unit, the deposit transport unit 162, the withdrawal transport unit 163, and the opening 161B in the bottom part of the hopper 161A of the feeding unit 161.

Thus, the withdrawal processing is completed. As described above, in the withdrawal control apparatus 10 according to Embodiment 1 of the present disclosure, it is decided, based on whether the inventory amount in the storage unit is in an accepted state, which of the first path, which passes through the recognition unit 17, and the second path, which does not pass through the recognition unit 17, is used in the withdrawal processing in the money handling apparatus 20. Since the withdrawal processing using the second path causes a withdrawal to be completed in a shorter time than the withdrawal processing using the first path, the second path is used in a state in which the inventory amount of the storage unit is accepted and the reconciliation processing is unnecessary, whereas the first path is used in a state in which the inventory amount of the storage unit is non-accepted and the reconciliation processing is necessary, which makes it possible to ensure the precision in the withdrawal processing as needed while shortening the time required for the withdrawal processing as much as possible.

Note that, the control unit 40 may control the shutter 22 in the withdrawal processing. For example, in a case where a withdrawal is performed from a storage unit whose inventory amount is in a non-accepted state, the control unit 40 may cause the shutter 22 to be closed during the withdrawal processing, and may cause the shutter 22 to be opened after every coin that is to be withdrawn is transported to the withdrawal unit 13.

In a case where a withdrawal is performed from a storage unit whose inventory amount is in a non-accepted state, the withdrawal processing is performed by using the first path, and thus, it may take a long time to perform the withdrawal processing. In this case, it is possible to prevent a coin(s) from being left behind by controlling the shutter 22. Further, since a withdrawal is performed from a storage unit whose inventory amount is in a non-accepted state, every coin that is to be withdrawn may not be able to be withdrawn. In this case, leaving the shutter 22 closed enables the user to cancel the withdrawal processing before taking out a coin(s) from the withdrawal unit 13. That is, it is possible to cancel uncompleted withdrawal processing.

The operation example of the withdrawal control apparatus 10 described in FIG. 5 is an example, and the operation of the withdrawal control apparatus in the present disclosure at the time of the withdrawal processing is not limited thereto. In the operation example illustrated in FIG. 5, it has been described that the control unit 40 decides that the first path is used in a case where the inventory amount of one of the storage units is in a non-accepted state, but in the present disclosure, the control unit 40 may also decide the path to be used, for example, based on whether the inventory amount (s) of the storage unit(s), which feed(s) out a coin(s) to be withdrawn, is/are in a non-accepted state.

Figure 6:
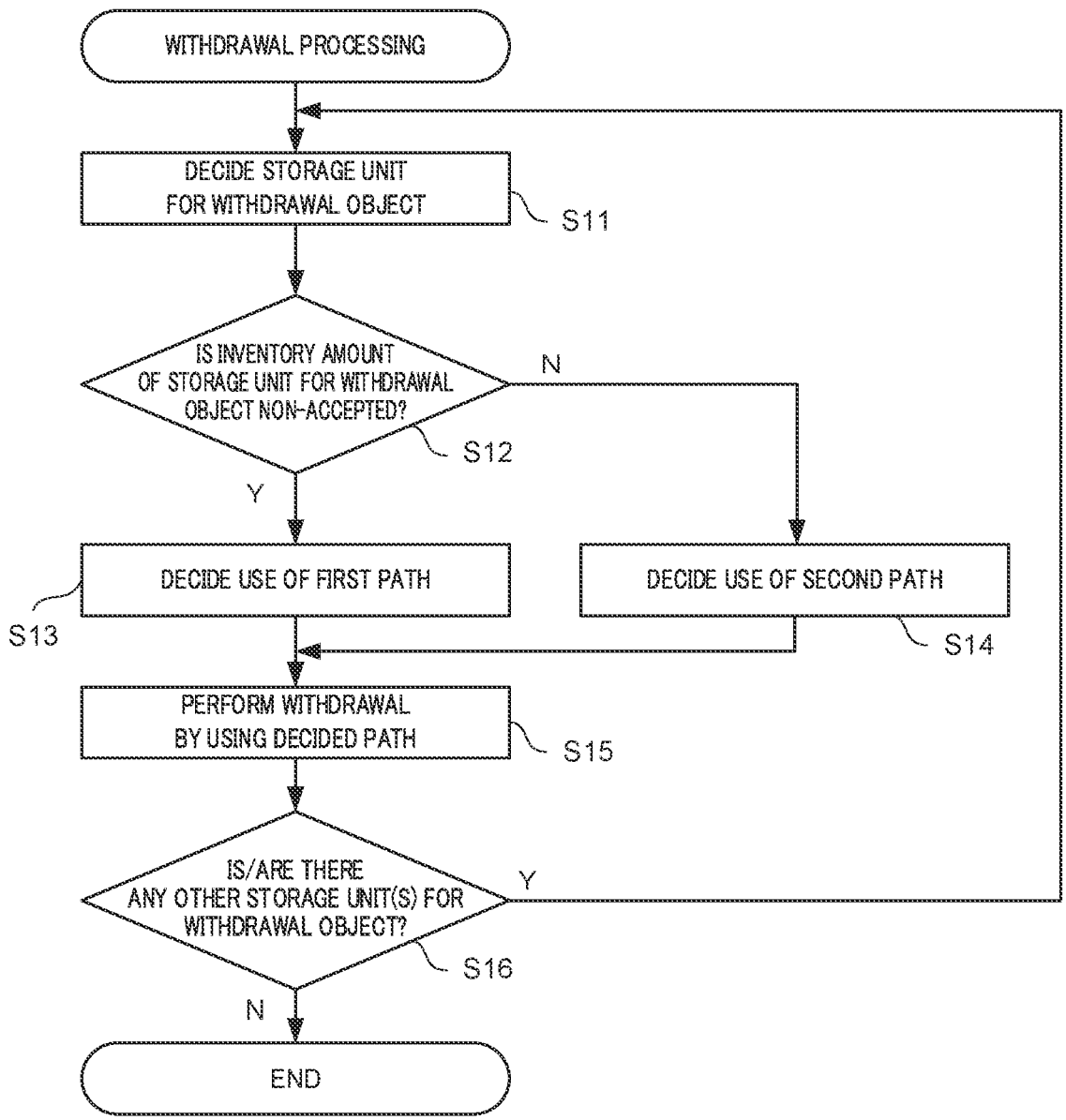
FIG. 6 is a flowchart provided for describing an operation example of the withdrawal processing in the withdrawal control apparatus.

FIG. 6 is a flowchart provided for describing another operation example of the withdrawal processing in the withdrawal control apparatus 10.

In step S11, the control unit 40 decides, as a storage unit for a withdrawal object, one storage unit that is required for feeding out a coin(s) of a denomination(s) required for withdrawal processing for which a request has been received.

In step S12, the control unit 40 refers to the state related to the inventory amount of the storage unit for the withdrawal object, and determines whether the inventory amount of the storage unit for the withdrawal object is in a non-accepted state.

In step S12, in a case where the control unit 40 determines that the inventory amount of the storage unit for the withdrawal object is in a non-accepted state (step S12: Y), the control unit 40 advances the processing to step S13, whereas the control unit 40 advances the processing to step S14 otherwise (step S12: N).

In step S13, the control unit 40 decides that a withdrawal is performed by using the first path.

In step S14, the control unit 40 decides that a withdrawal is performed by using the second path.

In step S15, the control unit 40 controls at least one of: the storage unit; the withdrawal transport unit 163; the feeding unit 161; the deposit transport unit 162; the recognition unit 17; and the diverter unit(s) 18A such that a coin(s) is/are withdrawn through the path decided in step S13 or S14. The specific contents of control are the same as those in the operation example described in FIG. 5.

In step S16, the control unit 40 determines whether there is/are a denomination(s), which is/are required for the withdrawal processing for which the request has been received, and whose coin(s) has/have not been withdrawn yet. That is, the control unit 40 determines whether there is/are any other storage unit(s) that is/are to be a storage unit(s) for a withdrawal object(s). In a case where the control unit 40 determines that there is/are another/other storage unit(s) for a withdrawal object(s) (step S16: Y), the control unit 40 causes the processing to return to the processing in step S11, whereas the control unit 40 ends the withdrawal processing otherwise (step S16: N).

The withdrawal control apparatus 10 may also perform an operation(s) described in FIG. 6 with the following additional operations. For example, in a case where a coin to be withdrawn is a coin of the denomination stored in the second denomination-specific storage unit and the inventory amount of the second denomination-specific storage unit is not non-accepted, the control unit may decide that the second path is used, even when the inventory amount of the first denomination-specific storage unit is non-accepted. Further, in a case where a coin to be withdrawn is a coin of the denomination stored in the first denomination-specific storage unit and the inventory amount of the first denomination-specific storage unit is not non-accepted, the control unit may decide that the second path is used, even when the inventory amount of the second denomination-specific storage unit.

Embodiment 2

In Embodiment 2, a money handling system 100 will be described. Configurations in Embodiment 2 which have the same functions as those in Embodiment 1 are denoted with the same reference signs, and descriptions thereof will be omitted.

Figure 7:
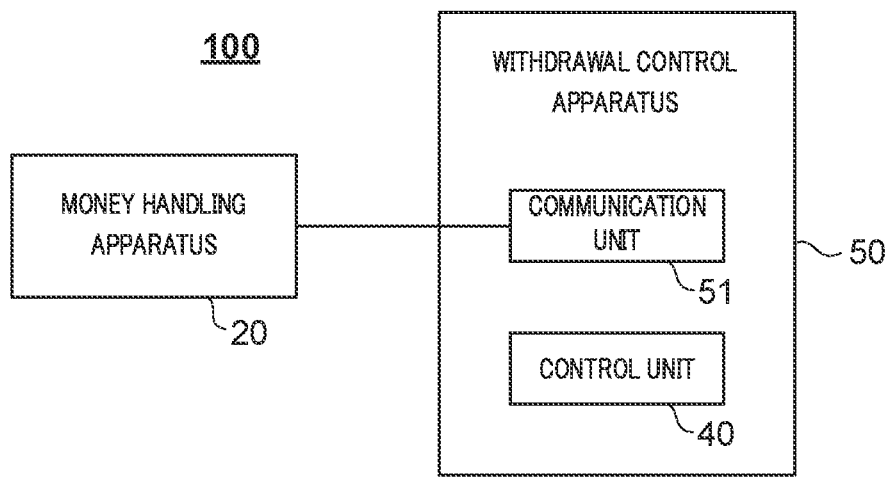
FIG. 7 is a diagram provided for describing a configuration of a money handling system according to Embodiment 2.

FIG. 7 is a diagram provided for describing a configuration of the money handling system 100 according to Embodiment 2. The money handling system 100 according to Embodiment 2 is configured such that the control unit 40, which is comprised by the withdrawal control apparatus 10 in Embodiment 1, is comprised by a withdrawal control apparatus 50 that is an apparatus independent of the money handling apparatus 20.

The withdrawal control apparatus 50 comprises the control unit 40 and a communication unit 51.

The communication unit 51 transmits and receives various information to and from a money handling apparatus 60. The communication unit 51 may communicate with the money handling apparatus 60 via a public network, such as the Internet, for example, or may communicate with the money handling apparatus 60 not via a network.

The control unit 40 of the withdrawal control apparatus 50 controls various processing in the money handling apparatus 20 in the same manner as in Embodiment 1, based on various information received from the money handling apparatus 20 via the communication unit 51. The various processing in the money handling apparatus 20 controlled by the withdrawal control apparatus 50 comprises deposit processing, replenishment processing, inventory amount determination processing, reconciliation processing, and withdrawal processing in the same manner as in Embodiment 1.

Figure 8:
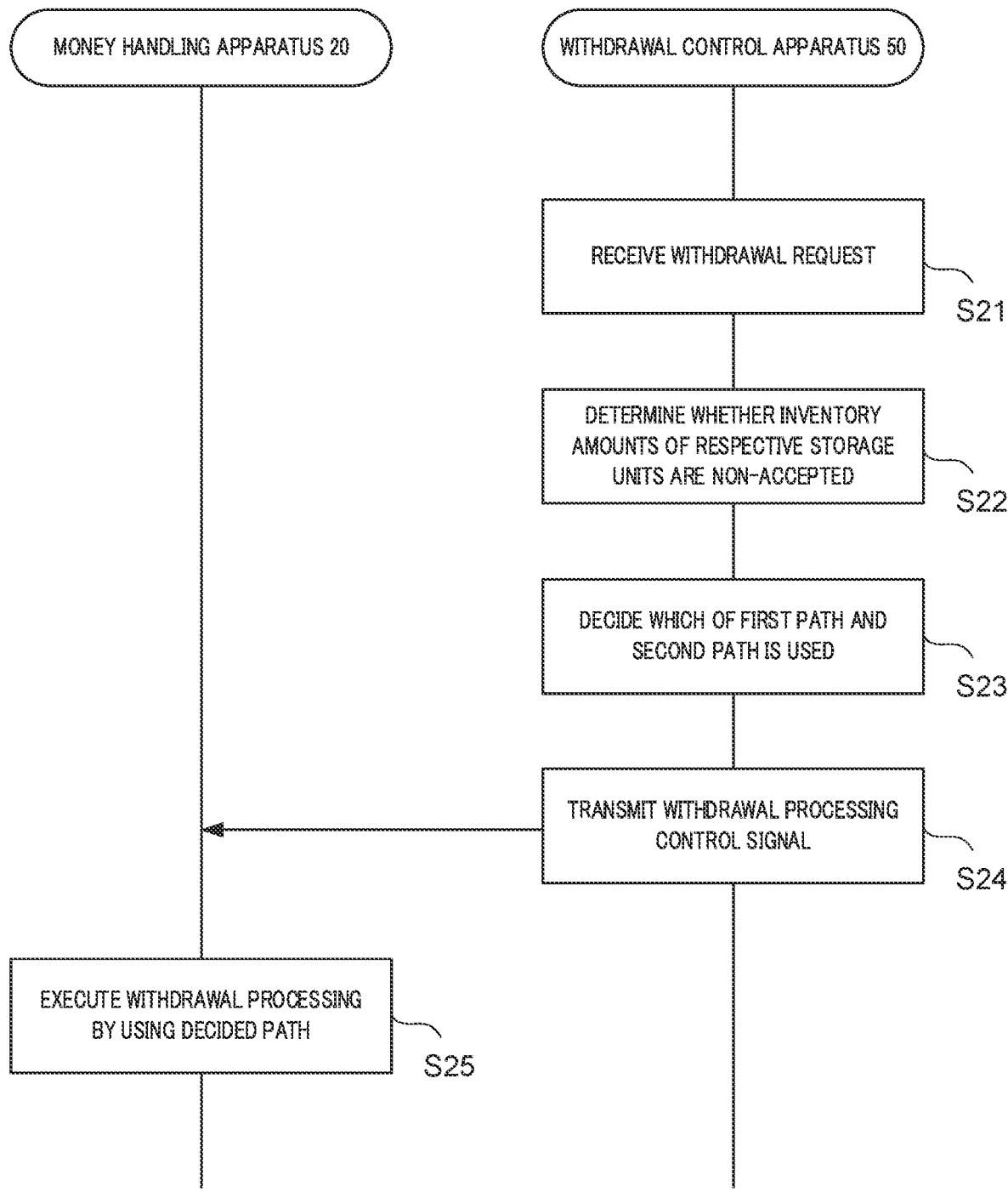
FIG. 8 is a sequence diagram provided for describing an operation example of withdrawal processing in the money handling system.

FIG. 8 is a sequence diagram provided for describing an operation example of the withdrawal processing in the money handling system 100 of Embodiment 2.

In step S21, the withdrawal control apparatus 50 receives a withdrawal request.

In step S22, the control unit 40 of the withdrawal control apparatus 50 refers, in response to the withdrawal request, to the flags indicating the states related to the inventory amounts of the respective storage units of the money handling apparatus 20, and determines whether the inventory amounts of the respective storage units are in an accepted state. The control unit 40 may execute, based on information which is transmitted from the money handling apparatus 20 whenever needed and indicates the states related to the inventory amounts of the respective storage units, the inventory amount determination processing whenever needed and may store the flags indicating the states related to the inventory amounts of the respective storage units in the memory. The flags indicating the states related to the inventory amounts of the respective storage units are also used to determine whether the reconciliation processing needs to be executed.

In step S23, the control unit 40 of the withdrawal control apparatus 50 decides, based on a determination result in step S22, which of the first path, in which recognition is performed, and the second path, in which recognition is not performed, is used to perform a withdrawal in the money handling apparatus 20.

In step S24, the control unit 40 of the withdrawal control apparatus 50 transmits a withdrawal processing control signal, which comprises information indicating the path decided in step S23 as well as information indicating a denomination(s) whose coin(s) is/are to be withdrawn, the number of coins of the denomination(s), and/or the like, to the money handling apparatus 20 via the communication unit 51.

In step S25, the money handling apparatus 20 executes the withdrawal processing based on withdrawal processing control information.

Thus, in the same manner as in Embodiment 1, it is decided, based on whether the inventory amount of the storage unit is in an accepted state, which of the first path, in which recognition is performed, and the second path, in which recognition is not performed, is used in the withdrawal processing in the money handling apparatus 20. Since the withdrawal processing using the second path causes a withdrawal to be completed in a shorter time than the withdrawal processing using the first path, the second path is used in a state in which the inventory amount of the storage unit is accepted and the reconciliation processing is unnecessary, whereas the first path is used in a state in which the inventory amount of the storage unit is non-accepted and the reconciliation processing is necessary, which makes it possible to ensure the precision in the withdrawal processing as needed while shortening the time required for the withdrawal processing as much as possible.

VARIATION

The embodiments of the present disclosure have been described in detail above. The present disclosure is not limited to these embodiments, and various variations are possible.

In Embodiments 1 and 2, an example in which the money handling apparatus handles coins. Hereinafter, a money handling apparatus 70 capable of handling banknotes will be described as a variation.

Figure 9:
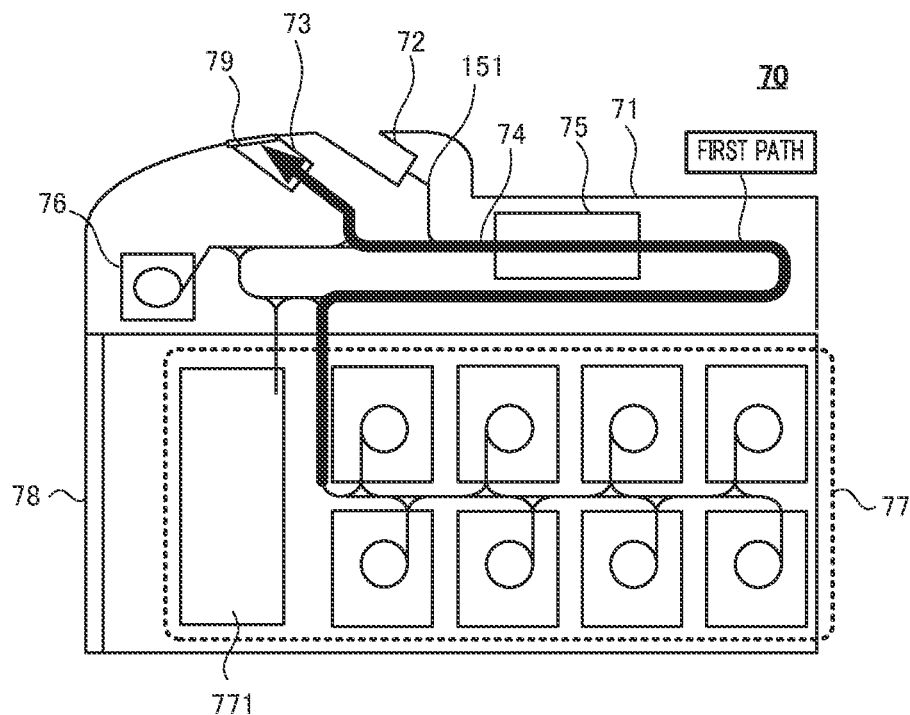
FIG. 9 is a diagram provided for describing the structure of a money handling apparatus that handles banknotes, and a first path in the money handling apparatus.
Figure 10:
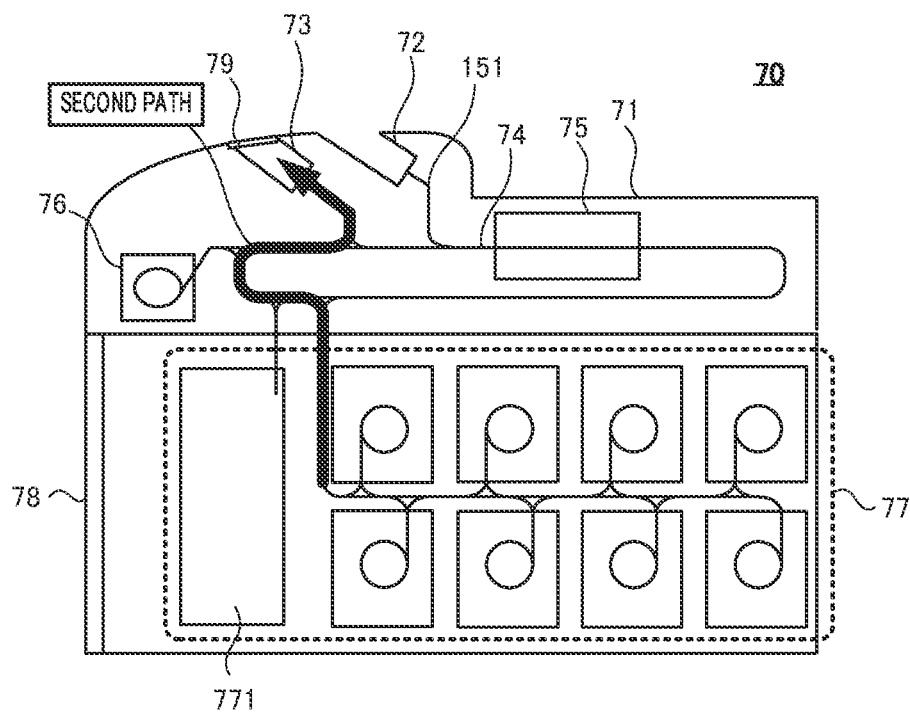
FIG. 10 is a diagram provided for describing the structure of the money handling apparatus that handles banknotes, and a second path in the money handling apparatus.

FIGS. 9 and 10 are diagrams provided for describing the structure of the money handling apparatus 70 that handles banknotes. FIG. 9 illustrates a first path in the money handling apparatus 70. FIG. 10 illustrates a second path in the money handling apparatus 70.

The money handling apparatus 70 comprises a casing 71, a deposit unit 72, a withdrawal unit 73, a transport unit 74, a recognition unit 75, a temporary storage unit 76, and a recycle storage unit 77.

The casing 71 is a housing that comprises each configuration of the money handling apparatus 70 therein. The casing 71 is provided with a door 78 that can be opened and closed by the manager. The deposit unit 72 receives a deposit into the money handling apparatus 70 by the user. The withdrawal unit 73 is, for example, a tray for causing the user to receive a banknote(s) withdrawn from the money handling apparatus 70. The withdrawal unit 73 may be provided with a shutter 79. The shutter 79 limits, in the closed state, access to a withdrawn banknote(s), and allows, in the open state, the user to take out a banknote(s).

The transport unit 74 transports a banknote(s) fed out from the temporary storage unit 76 or the recycle storage unit 77. The transport unit 74 comprises a loop-shaped transport path. The recognition unit 75 recognizes the denomination, authentication, fitness, and the like of a banknote(s) transported on the transport unit 74 and counts the number of banknotes.

The temporary storage unit 76 is used for a plurality of applications. For example, in deposit processing and reconciliation processing, the temporary storage unit 76 temporarily stores a banknote(s). The recycle storage unit 77 is a storage unit capable of storing and feeding out a banknote(s). The recycle storage unit 77 comprises a plurality of storage units. One or some of the storage units of the recycle storage unit may be used as a multi-purpose storage unit 771. The multi-purpose storage unit 771 stores, for example, a rejected note(s) and an unfit note(s).

Each configuration of the money handling apparatus 70 is controlled by a control unit comprising the same functions as those of the control unit 40 described in Embodiments 1 and 2. The control unit in the present variation may be provided inside the casing 71 in the same manner as in Embodiment 1 or a withdrawal control apparatus independent of the money handling apparatus 70 may comprise the control unit in the present variation in the same manner as in Embodiment 2.

In the money handling apparatus 70 as such, one of the first path illustrated in FIG. 9 and the second path illustrated in FIG. 10 is selected and used for a withdrawal in the withdrawal processing. The first path is a path on which a banknote(s) is/are transported from the recycle storage unit 77 to the withdrawal unit 73 while passing through the recognition unit 75. The second path is a path on which a banknote(s) is/are transported, without passing through the recognition unit 75, from the recycle storage unit 77 while passing through the side opposite to the first path in the loop-shape that forms the transport unit 74.

Even in the present variation, in the same manner as in Embodiments 1 and 2 described above, the first path is longer than the second path, and thus, the withdrawal processing using the second path enables a withdrawal in a shorter time that the withdrawal processing using the first path. For this reason, even in the present variation, it is decided, based on whether the inventory amount of the storage unit is in an accepted state, which of the first path, in which recognition is performed, and the second path, in which recognition is not performed, is used, and thus, the second path is used in a state in which the inventory amount of the storage unit is accepted and the reconciliation processing is unnecessary, while the first path is used in a state in which the inventory amount of the storage unit is non-accepted and the reconciliation processing is necessary, which makes it possible to ensure the precision in the withdrawal processing as needed while shortening the time required for the withdrawal processing as much as possible.

Further, even in the present variation, in the same manner as in Embodiments 1 and 2 described above, the control unit may control the shutter 79 in the withdrawal processing. For example, in a case where a withdrawal is performed from a storage unit whose inventory amount is in a non-accepted state, the control unit may cause the shutter 79 to be closed during the withdrawal processing, and may cause the shutter 79 to be opened after every banknote that is to be withdrawn is transported to the withdrawal unit 73. Thus, it is possible to prevent a banknote(s) from being left behind. Further, it is possible to cancel uncompleted withdrawal processing.

Further, in the money handling apparatus 70, the control unit may perform control, in a case where the withdrawal processing is performed by using the first path, such that a banknote(s) to be withdrawn is/are transported from the recycle storage unit 77 to the temporary storage unit 76 and, after every banknote to be withdrawn is transported to the temporary storage unit 76, the banknote(s) stored in the temporary storage unit 76 is/are transported to the withdrawal unit 73. Thus, it is possible to prevent a banknote(s) from being left behind. Further, it is possible to cancel uncompleted withdrawal processing.

Further, in a case where a banknote(s) stored in the temporary storage unit 76 is/are transported to the withdrawal unit 73, the control unit may perform control such that the second path is used. Thus, it is possible to perform a withdrawal in a shorter time.

Example of Hardware Configuration

In each embodiment described above, it has been described that the control unit 40 is a processor formed of electric circuitry and each of the withdrawal control apparatuses 10 and 50 comprising the control unit 40 is an example of a computer comprising a processor. Hereinafter, an example of a hardware configuration of a computer that realizes the withdrawal control apparatus in the present disclosure will be described.

Figure 11:
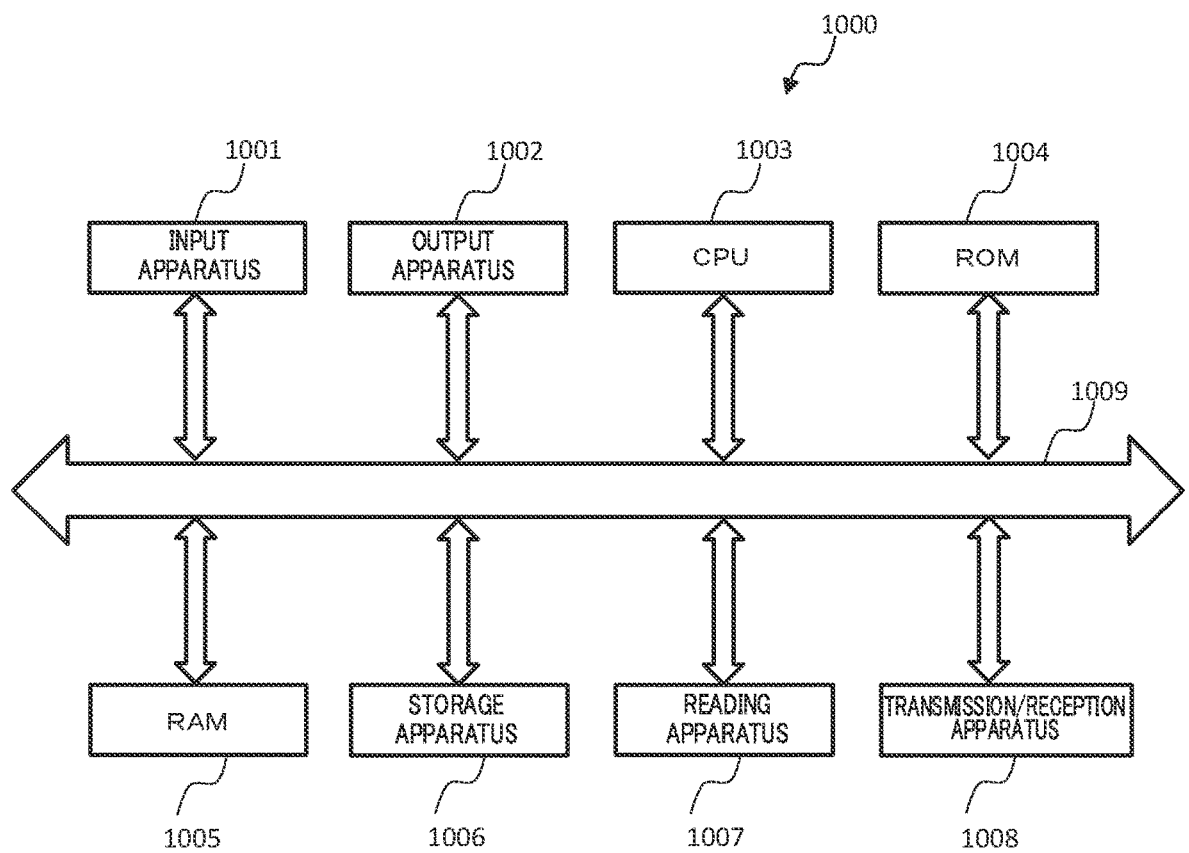
FIG. 11 illustrates an example of a hardware configuration of the withdrawal control apparatus as a computer.

FIG. 11 illustrates an example of a hardware configuration of the withdrawal control apparatuses 10 and 50 each as a computer.

A computer 1000 comprises an input apparatus 1001, an output apparatus 1002, a CPU 1003, a read only memory (ROM) 1004, a random access memory (RAM) 1005, a storage apparatus 1006, a reading apparatus 1007 for reading information from various kinds of non-transitory computer-readable recording media, and a transmission/reception apparatus 1008, and the respective units are connected by a bus 1009.

The reading apparatus 1007 reads a program for implementing the functions of the withdrawal control apparatuses 10 and 50 from a non-transitory computer-readable recording medium that records the program, and causes the storage apparatus 1006 to store the program. Alternatively, the transmission/reception apparatus 1008 communicates with a system apparatus connected to a network and causes the storage apparatus 1006 to store a program downloaded from the system apparatus.

Then, the CPU 1003 copies the program stored in the storage apparatus 1006 to the RAM 1005, sequentially reads instructions comprised in the program from the RAM 1005, and executes the instructions, thereby implementing the functions of the withdrawal control apparatuses 10 and 50.

What is claimed is:

1. A coin handling system, comprising:
a coin handling apparatus that comprises a withdrawal unit, at least one of storage units, a first transport unit, a second transport unit, and a feeding unit, the storage units configured to store a coin, the first transport unit provided downward from the storage units and configured to transport the coin fed out from the at least one of the storage units, the second transport unit configured to transport the coin one by one to the withdrawal unit and provided with a recognition unit configured to recognize the coin, the feeding unit configured to receive the coin transported by the first transport unit and feed the received coin to one of the withdrawal unit and the second transport unit;
a withdrawal control apparatus that comprises a processor, the processor controlling the coin handling apparatus, wherein the processor is configured to execute:
performing reconciliation processing of accepting an inventory amount of the at least one of the storage units by recognizing and re-counting every coin stored in the storage unit;
performing determination whether the inventory amount of coin stored in the at least one of the storage units is in an accepted state where the reconciliation processing is unnecessary or in a non-accepted state where the reconciliation processing is necessary; and
deciding, in response to a withdrawal request for withdrawing coin, which of a first path and a second path is used as a movement path of the coin from the at least one of the storage units to the withdrawal unit, based on a result of the determination, the first path passing through the recognition unit, the second path not passing through the recognition unit, wherein in a case where the inventory amount of the at least one of the storage units is in the accepted state, the processor is configured to decide that the second path is used, and in a case where the inventory amount of the at least one of the storage units is in the non-accepted state, the processor is configured to decide that the first path is used, and
a casing having the coin handling apparatus and the withdrawal control apparatus built-in, wherein
the processor is further configured to control the feeding unit such that the coin received by the feeding unit is discharged to the second transport unit in a case where the processor has decided to use the first path, and the coin received by the feeding unit is discharged to the withdrawal unit in a case where the processor has decided to use the second path.

2. The coin handling system according to claim 1, wherein in the deciding,
in a case where the inventory amount of the at least one of the storage units is in the non-accepted state, the processor is configured to decide that the first path is used, the first path comprising a first portion through which the coin is transported, the second path comprising a second portion through which the coin is transported, the first portion being longer than the second portion in length.

3. The coin handling system according to claim 1, wherein in the performing of the determination,
in a case where it is detected that a door for accessing an inside of the coin handling apparatus has been opened, the processor is configured to determine, that the inventory amount of the at least one of the storage units is in the non-accepted state.

4. The coin handling system according to claim 1, wherein in the performing of the determination,
in a case where it is detected that the at least one of the storage units has been detached from the coin handling apparatus or the at least one of the storage units has been attached to the coin handling apparatus, the processor is configured to determine, that the inventory amount of the at least one of the storage units is in the non-accepted state.

5. The coin handling system according to claim 1, wherein in the performing of the determination,
in a case where it is detected that an error has occurred in a diverter unit, the processor is configured to determine, that the inventory amount of the at least one of the storage units is in the non-accepted state, the diverter unit configured to move the coin from the second transport unit to the at least one of the storage units.

6. The coin handling system according to claim 5, wherein in the performing of the determination,
in a case where it is detected that an error has occurred while the coin is being transported by the second transport unit, the processor is configured to determine, that the inventory amount of the at least one of the storage units is in the non-accepted state.

7. The coin handling system according to claim 1, wherein in the performing of the determination,
in a case where it is detected that an error has occurred when the coin is fed out from the at least one of the storage units, the processor is configured to determine, that the inventory amount of the at least one of the storage units is in the non-accepted state.

8. The coin handling system according to claim 1, wherein in the performing of the determination,
in a case where it is detected that power supply has been cut off while the coin handling apparatus is in operation, the processor is configured to determine, that the inventory amount of the at least one of the storage units is in the non-accepted state, the coin handling apparatus comprising the storage units, the recognition unit, and the withdrawal unit.

9. The coin handling system according to claim 1, wherein in the performing of the determination,
in a case where it is detected that the at least one of the storage units for which only a first denomination has been set as a denomination of coin to be stored has possibly stored coin of a second denomination other than the first denomination, the processor is configured to determine, that the inventory amount of the at least one of the storage units is in the non-accepted state.

10. The coin handling system according to claim 1, wherein:
in the performing of the determination, the processor is configured to perform the determination with respect to each of a first storage unit and a second storage unit among the storage units, and
in the deciding, the processor is configured to perform the deciding, in a case where a withdrawal is performed from the first storage unit, based on a result of the determination with respect to the first storage unit, regardless of a result of the determination with respect to the second storage unit.

11. The coin handling system according to claim 1,
wherein the withdrawal unit is provided with a shutter that limits access to the coin in a closed state and allows a user to take out the coin in an open state, and
wherein in the deciding,
in a case where it is decided that the first path is used, the processor is configured to control, in response to the withdrawal request, the shutter such that the shutter is closed while the coin is moving from the at least one of the storage units to the withdrawal unit and, the shutter is opened after all the coin that is to be withdrawn is transported to the withdrawal unit.

12. A coin handling system according to claim 1, further comprising
a casing having the coin handling apparatus and the withdrawal control apparatus built-in, wherein
the withdrawal unit is provided in an upper portion of a front surface part of the casing.

13. A coin handling system according to claim 1, wherein the first transport unit is provided downward from the feeding unit.

14. A coin handling system according to claim 1, wherein
the withdrawal unit is provided below the feeding unit,
a bottom part of the feeding unit is provided with an opening, and
the processor is further configured to control opening the opening to discharge the coin within the feeding unit into the withdrawal unit.

15. A coin handling system according to claim 14, wherein
the feeding unit is configured to use a rotary disk that rotates in an inclined state to pick up the coin one by one by a plurality of projection members in an outer area of a surface of the rotary disk for feeding.

16. A coin handling system according to claim 1, wherein
the second transport unit is formed in a loop shape, and comprises a chute that causes the coin to be transported to fall into the withdrawal unit.

17. The coin handling system according to claim 1, further comprising a cassette that is detachably attached to the coin handling apparatus and configured to store the coin and discharge the stored coin, wherein
the storage units are further configured to store the coin of one denomination,
the cassette is further configured to store one or more coins of a plurality of kinds of denominations, and
the processor is further configured to execute replenishment processing of replenishing the at least one of the storage units with the coin stored in the cassette.

18. The coin handling system according to claim 17, wherein the processor is further configured to control, in response to the withdrawal request, transporting the coin stored in the cassette to the withdrawal unit.

19. The coin handling system according to claim 1, wherein the feeding unit is provided on upward from the storage units, the processor is further configured to control the first transport unit to transport the coin fed out from the at least one of the storage units, upward to the feeding unit.

\* \* \* \* \*